US009184645B2

(12) United States Patent
Riehl et al.

(10) Patent No.: US 9,184,645 B2
(45) Date of Patent: Nov. 10, 2015

(54) ELECTRIC MACHINE WITH IMPROVED HEAT MANAGEMENT

(75) Inventors: Guenther Riehl, Buehl (DE); Johann Braun, Buehl (DE); Joerg Schmid, Achem (DE); Christoph Heier, Iffezheim (DE); Thomas Heid, Lauf (DE); Claudius Muschelknautz, Buehl (DE); Tilo Koenig, Buehl (DE); Jerome Thiery, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 13/976,161

(22) PCT Filed: Nov. 18, 2011

(86) PCT No.: PCT/EP2011/070417
§ 371 (c)(1),
(2), (4) Date: Jun. 26, 2013

(87) PCT Pub. No.: WO2012/089406
PCT Pub. Date: Jul. 5, 2012

(65) Prior Publication Data
US 2013/0270942 A1 Oct. 17, 2013

(30) Foreign Application Priority Data

Dec. 27, 2010 (DE) .......................... 10 2010 064 190

(51) Int. Cl.
H02K 11/00 (2006.01)
H02K 19/02 (2006.01)
H02K 5/128 (2006.01)
H02K 5/22 (2006.01)

(52) U.S. Cl.
CPC ............. *H02K 19/02* (2013.01); *H02K 5/128* (2013.01); *H02K 5/225* (2013.01); *H02K 11/0073* (2013.01)

(58) Field of Classification Search
USPC .......................... 310/71, 43, 85–90
See application file for complete search history.

(56) References Cited

U.S. PATENT DOCUMENTS 5,394,043 A * 2/1995 Hsia ................................. 310/90
5,644,178 A * 7/1997 Halm ............................... 310/43
5,923,108 A * 7/1999 Matake et al. ................... 310/89

(Continued)

FOREIGN PATENT DOCUMENTS

CN 1755092 4/2006
CN 1941550 4/2007

(Continued)

OTHER PUBLICATIONS

International Search Report for Application No. PCT/EP2011/070417 dated Jul. 23, 2012 (2 pages).

*Primary Examiner* — Thanh Lam
(74) *Attorney, Agent, or Firm* — Michael Best & Friedrich LLP

(57) ABSTRACT

The invention relates to an electric machine, comprising a stator (2), a rotor (3), a split cage (4), which separates a wet region (5) from a dry region (6), control electronics (9) and an interconnection element (7, 8), which produces an electrical contact between the stator (2) and the control electronics (9), wherein the rotor (3) is arranged in the wet region (5), wherein the interconnection element (7, 8) is surrounded at least partially by an insulating element (10), and wherein the insulating element (10) divides the dry region (6) into a first subregion (60), in which the stator (2) is arranged, and a second subregion (61), in which the control electronics (9) are arranged.

12 Claims, 1 Drawing Sheet

(56) References Cited

U.S. PATENT DOCUMENTS

| | | | |
|---|---|---|---|
| 6,175,173 B1* | 1/2001 | Stephan et al. | 310/87 |
| 6,177,741 B1* | 1/2001 | Lutkenhaus et al. | 310/71 |
| 6,365,998 B1* | 4/2002 | Kech et al. | 310/194 |
| 2002/0125776 A1* | 9/2002 | Hsueh | 310/87 |
| 2007/0290568 A1* | 12/2007 | Ihle et al. | 310/257 |
| 2008/0219867 A1* | 9/2008 | Sakata | 417/410.1 |

FOREIGN PATENT DOCUMENTS

| | | |
|---|---|---|
| DE | 19939522 | 2/2001 |
| EP | 1079112 | 2/2001 |
| WO | 2010108709 | 9/2010 |

\* cited by examiner

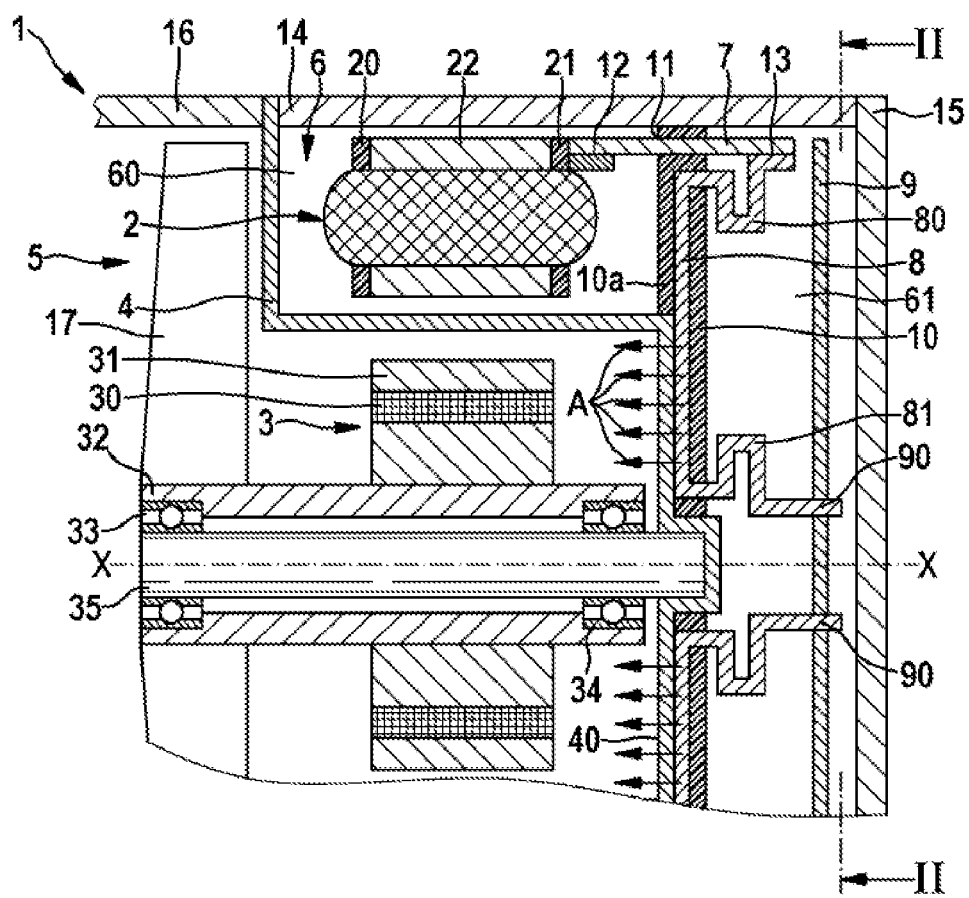
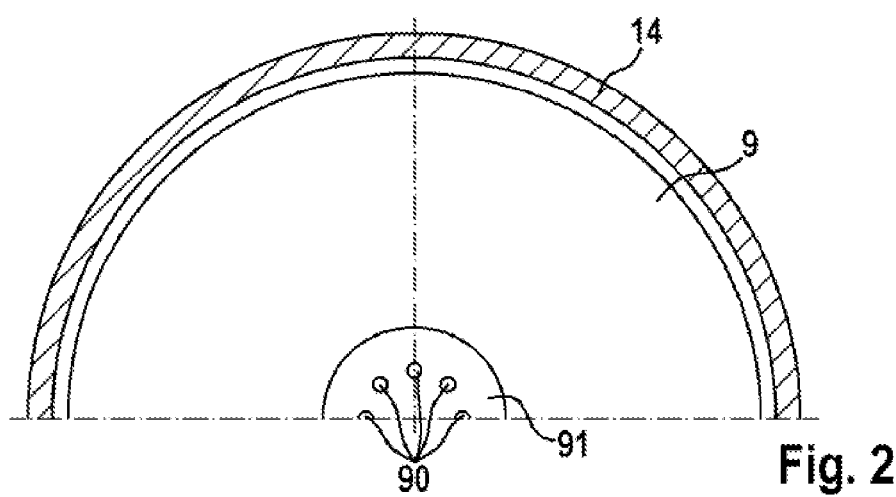

ELECTRIC MACHINE WITH IMPROVED HEAT MANAGEMENT

BACKGROUND OF THE INVENTION

The present invention relates to an electric machine with improved heat management, wherein the electric machine is a so called wet rotor machine with a split cage, which separates a wet region from a dry region.

Electric machines in the form of EC wet rotor motors are known in various configurations and are generally used for applications in which a rotary movement is produced in the medium and a dynamic sealing is avoided. One use sector is pumps, for example. In order to achieve physical forms which are as small as possible, control electronics, for example in the form of a printed circuit board, are integrated in a dry region of the electric machine. In this case, the rotor is arranged in the wet region and the stator is arranged in the dry region, wherein generally only internal rotor motors are implemented since the splash losses in the wet region are otherwise overproportionally great in the case of large rotor diameters. Owing to the integration of the control electronics in the dry region of the electric machine in combination with high ambient temperatures, high thermal loads result. Owing to the integration in a very narrow physical space, high temperatures result both at the winding of the electric machine and in the component parts of the electronics. The heat produced in the stator or the stator winding is in this case conducted via a good thermal connection, for example via short copper lines with good thermal conductivity and often having large cross sections and/or is conducted directly onto the control electronics from the stator via thermal radiation.

SUMMARY OF THE INVENTION

The electric machine according to the invention has the advantage over the prior art that thermal loading of the control electronics integrated in the electric machine can be significantly reduced. In particular, by means of the concept according to the invention, the radiation heat from the stator onto the control electronics can be reduced and the heat conducted via electrical contacts from the stator to the control electronics can also be reduced. This is achieved according to the invention by virtue of the fact that, firstly, an insulation element is used which divides the dry region of the electric machine into a first subregion and a second subregion, in terms of thermal radiation. In this case, the stator is arranged in the first subregion and the control electronics are arranged in the second subregion. Therefore, the insulation element forms a shield for the control electronics from the stator. In this case, the electric machine can have a very compact and inexpensive design.

Further preferably, the interconnection element producing the electrical contact comprises a first section and/or a second section in meandering form. In this case, the first meander is used for connection to the control electronics and the second meander is used for connection to the stator. The two meanders in this case make it possible for the individual component parts of the electric machine to be able to compensate for the various thermal expansions owing to different coefficients of thermal expansion over the different temperature levels prevailing during operation. A further advantage consists in that, in particular in the case of an application in the automotive sector, vibration loading etc. can be absorbed more easily since the meanders have, to a certain extent, resilient properties and in particular the control electronics and the soldered joints are thus relieved of load.

Further preferably, the interconnection element is formed in two parts with a first interconnection part and a second interconnection part. This results in advantages in particular in terms of manufacturing. Preferably, in this case the first and second meandering structures are arranged on the second interconnection part. As a result, the two meandering structures are in the thermally shielded second region of the dry region.

Further preferably, a region of the interconnection element is completely surrounded by the insulation element. This makes it possible to ensure that as little heat as possible is transmitted by radiation into the second region of the dry region and as much heat as possible can be emitted by the interconnection element at the split cage.

In accordance with a particularly preferred configuration of the invention, the insulating element is produced from plastic. Particularly preferably, in this case the insulating element is a plastic injection-molded encapsulation or a plastic plug type part, which is arranged on the interconnection element.

Further preferably, the electrical connections between the interconnection element and the control electronics can be reduced to one or a few small regions. As a result, in the soldering operation for connecting the control electronics, only one or a few instead of a number of solder pots can be used. As a result, a large area can be saved in particular on the control electronics since only one or a few solder pots are required. As a result, an even more compact design can be provided.

Preferably, an interconnection element, which produces an electrical contact between the stator and the control electronics, is arranged in such a way that it rests partially on the split cage or has a thermal connection to the split cage which is as good as possible. As a result, a transfer of heat from the interconnection element to the split cage can be enabled such that the heat conducted via the interconnection element into the control electronics is significantly reduced. Since one side of the split cage is in contact with the cooler wet region, the split cage can form a heat sink. A particularly compact design is obtained when the interconnection element rests on a base region of the split cage.

The electric machine according to the invention is preferably an EC motor. A preferred application area of the invention is in this case in pumps for vehicles or in building services, and in valves and in other fluid regulation systems.

BRIEF DESCRIPTION OF THE DRAWINGS

A preferred exemplary embodiment of the invention will be described in detail below with reference to the attached drawing, in which:

FIG. 1 shows a schematic half sectional view through an electric machine according to the invention, and FIG. 2 shows a schematic half sectional view along the line II II in FIG. 1.

DETAILED DESCRIPTION

An electric machine 1 in accordance with an exemplary embodiment of the invention will be described in detail below with reference to FIGS. 1 and 2.

In this case, the electric machine 1 comprises a stator 2 and a rotor 3, wherein a split cage 4 is arranged between the stator and the rotor. The split cage 4 divides the electric machine into a wet region 5 and a dry region 6. The split cage 4 is in this case fixed on the housing, wherein the housing comprises a motor housing 14, a cover 15 and a pump housing 16. The rotor 3 is fastened on a rotor shaft 32 and comprises permanent magnets 30 and a magnetic return path 31. The rotor shaft 32 is in the form of a hollow shaft and is mounted on a locationally fixed spindle 35 via two bearings 33, 34. In this case, the spindle 35 is fixedly fixed on the split cage 4 in a correspondingly formed cutout in the base 40 of the split cage.

The stator 2 comprises a laminate stack, a winding and a first and a second insulating mask 20, 21.

In addition, the electric machine 1 comprises a two part interconnection element with a first interconnection element 7 and a second interconnection element 8. The first interconnection element 7 is connected to the winding via an electrical contact 12 and is part of the stator 2. Furthermore, the first interconnection element 7 is connected to the second interconnection element 8 via an electrical contact 13. The second interconnection element 8 is connected to control electronics 9 in the form of a printed circuit board via an electrical contact 90.

As is clear from FIG. 1, the printed circuit board 9 is in this case arranged in a second subregion 61 of the dry region 6. The stator 2 is arranged in a first subregion 60 of the dry region 6. The first and second subregions 60, 61 are separated from one another by an insulating element 10. As is clear from FIG. 1, a bushing 11 is formed in the insulating element 10, with the first interconnection element 7 being passed through said bushing 11. The insulating element 10 in this exemplary embodiment is a plastic injection-molded encapsulation, which at least partially surrounds the second interconnection element 8. As is clear from FIG. 1, the insulating element 10 forms, in the subregion 10a, complete insulation of the second interconnection element 8 both with respect to the first subregion 60 and with respect to the second subregion 61 of the dry region 6. The second interconnection element 8, as is clear from FIG. 1, is in this case arranged on or at least partially on a base 40 of the split cage 4. In this region, the insulating element 10 is only arranged on the second interconnection element 8 on the side pointing towards the control electronics 9. The arrows A in this case indicate a heat transfer from the second interconnection element 8 over the base region of the split cage 4 into the wet region 5. The second interconnection element 8 comprises a first meandering section 80 and a second meandering section 81. The two meandering sections 80, 81 are arranged in the second subregion 61 of the dry region 6. The meandering sections 80, 81 in this case enable in particular a different thermal expansion of component parts without, as a result, the component parts being damaged. In addition, the two meandering sections 80, 81 in particular protect the control electronics 9 even in the case of use in the automotive sector, largely from excessively high static and dynamic forces since these meandering sections, to a certain extent, provide a resilient function.

As can further be seen from FIG. 2, electrical contacts 90, which produce a connection between the second interconnection element 8 and the control electronics 9, are arranged on one space or a few small spaces. In this case, all of the electrical contacts 90 can be arranged between the second interconnection element 8 and the control electronics 9 on one or a few solder pots 91, with the result that a large area can be saved on the printed circuit board of the control electronics 9 since a separate soldering pot no longer needs to be provided, as in the prior art, for each electrical connection, but the electrical connections 90 can be arranged at a common soldering pot 90 in accordance with the invention.

Thus, in accordance with the invention, as illustrated in FIG. 1, the control electronics 9 can be arranged in a second subregion 61 of the dry region 6, which second subregion 61 is shielded thermally from the first subregion 60 by the insulating element 10, with the stator 2, which is a main source of heat of the electric machine, being arranged in the first subregion 60. As shown in FIG. 1, the insulating element 10 in this case reaches from a cylindrical region of the split cage 4 as far as the motor housing 14. Thus, thermal radiation from the stator 2 to the control electronics 9 can be reduced. Thermal conduction from the stator 2 via the first and second interconnection elements 7, 8 onto the control electronics 9 is in this case likewise reduced since the second interconnection element 8 is connected, ideally with as good thermal transfer as possible, to the base 40 of the split cage. As a result, the heat introduced into the interconnection elements 7, 8 from the stator 2 can be emitted at the split cage 4 and from there into the wet region 5. By virtue of the rotation of the rotor, there is sufficient swirling of the medium in the blind hole like region of the split cage 4, with the result that the heat transferred via the base 40 into the wet region 5 can be dissipated quickly by the medium. Thus, a heat input into the control electronics 90 can be significantly reduced.

The meandering sections 80, 81 also ensure a flexible connection of the control electronics 9 to the stator 2, with the result that even different coefficients of thermal expansion of the component parts do not represent a hazard. In addition, a soldering operation can be realized at the control electronics 9 with only one or a few solder pots. In this case, the electric machine according to the invention nevertheless has a very compact design and can be produced very inexpensively, in particular when the insulating element 10 is in the form of an injection molded part.

The invention claimed is:

1. An electric machine, comprising:
   a stator (2),
   a rotor (3),
   a split cage (4), which separates a wet region (5) from a dry region (6),
   control electronics (9), and
   an interconnection element (7, 8), which produces an electrical contact between the stator (2) and the control electronics (9),
   wherein the rotor (3) is arranged in the wet region (5),
   wherein the interconnection element (7, 8) is at least partially surrounded by an insulating element (10), and
   wherein the insulating element (10) is constructed from plastic and divides the dry region (6) into a first subregion (60), in which the stator (2) is arranged, and a second subregion (61), in which the control electronics (9) are arranged, wherein the insulating element forms a thermal radiation shield for the control electronics.

2. The electric machine as claimed in claim 1, characterized in that the interconnection element (8) comprises a first meandering section (80) and a second meandering section (81).

3. The electric machine as claimed in claim 2, characterized in that the interconnection element (7, 8) is formed in two parts with a first interconnection element and a second interconnection element.

4. The electric machine as claimed in claim 3, characterized in that the first and second meandering sections (80, 81) are arranged on the second interconnection element (8), wherein the second interconnection element is arranged in the second subregion (61) of the dry region (6).

5. The electric machine as claimed in claim 1, characterized in that the interconnection element (7) is passed through the insulating element (10).

6. The electric machine as claimed in claim 1, characterized in that the insulating element (10) is produced from plastics.

7. The electric machine as claimed in claim 1, characterized in that an electrical contact (90) is present between the interconnection element (8) and the control electronics (9) at a diameter (D1) which substantially corresponds to an outer diameter (D2) of the rotor (3) or is smaller than the outer diameter (D2) of the rotor (3).

8. The electric machine as claimed in claim 1, characterized in that the interconnection element (7, 8) rests at least partially on the split cage (4).

9. The electric machine as claimed in claim 8, characterized in that the interconnection element (8) rests on a base region (40) of the split cage (4).

10. The electric machine as claimed in claim 1, characterized in that the electric machine is an electronically commutated motor.

11. The electric machine as claimed in claim 1, characterized in that the interconnection element (8) comprises a first meandering section (80).

12. The electric machine as claimed in claim 1, characterized in that the insulating element (10) is provided as a plastic-injection-molded encapsulation or as a plastic plug-type part.

* * * * *